(12) United States Patent
Sanjay et al.

(10) Patent No.: US 10,579,963 B2
(45) Date of Patent: Mar. 3, 2020

(54) SELF-ADAPTIVE INVENTORY AND FIXTURE TRACKING

(71) Applicant: Intel Corporation, Santa Clara, CA (US)

(72) Inventors: Addicam Sanjay, Gilbert, AZ (US); Narendra Patel, Chandler, AZ (US); Shao-Wen Yang, San Jose, CA (US); Jose Avalos, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,075

(22) Filed: Sep. 28, 2017

(65) Prior Publication Data

US 2019/0095852 A1   Mar. 28, 2019

(51) Int. Cl.
| | | |
|---|---|---|
| *G06Q 10/08* | (2012.01) | |
| *G06K 7/10* | (2006.01) | |
| *G06K 17/00* | (2006.01) | |
| *G01S 5/02* | (2010.01) | |
| *G06K 19/077* | (2006.01) | |
| *H04L 29/08* | (2006.01) | |
| *H04W 4/80* | (2018.01) | |
| *G06N 20/00* | (2019.01) | |

(52) U.S. Cl.
CPC ....... *G06Q 10/087* (2013.01); *G06K 7/10386* (2013.01); *G06K 17/0022* (2013.01); *G01S 5/0284* (2013.01); *G01S 5/0294* (2013.01); *G06K 19/077* (2013.01); *G06N 20/00* (2019.01); *H04L 67/12* (2013.01); *H04W 4/80* (2018.02)

(58) Field of Classification Search
CPC ........... G06K 17/0022; G06K 7/10386; G06K 19/077; G06K 2017/0051; G01S 5/0284; G01S 5/0294; G06Q 10/087; G06N 20/00; H04W 4/80; H04L 67/12
USPC ......................................................... 235/385
See application file for complete search history.

(56) References Cited

U.S. PATENT DOCUMENTS

| | | | | |
|---|---|---|---|---|
| 7,954,712 B2* | 6/2011 | Babcock | ................ | G06Q 10/08 235/375 |
| 8,161,910 B2* | 4/2012 | Coiro, Sr. | ............. | A01K 1/031 119/417 |
| 9,092,754 B1* | 7/2015 | Lessard | ................ | G06Q 10/087 |
| 9,418,352 B2 | 8/2016 | Lortz et al. | | |
| 9,740,895 B1* | 8/2017 | Liu | ........................ | G06Q 10/00 |
| 9,740,897 B1* | 8/2017 | Salour | ................ | G06K 7/10316 |
| 9,940,663 B2* | 4/2018 | Ward | ................ | G06Q 30/0639 |

(Continued)

OTHER PUBLICATIONS

Intel, "Intel unveils new Intel responsive retail platform and plans for $100 million investment at NRF 2017", retrieved from newsroom. intel.com/news/intel-unveils-new-intel-responsive-retail-platform-plans-100-million-investment-nrf-2, Jan. 16, 2017, 5 pages.

(Continued)

*Primary Examiner* — Seung H Lee
(74) *Attorney, Agent, or Firm* — Jordan IP Law, LLC

(57) ABSTRACT

An embodiment of a semiconductor package apparatus may include technology to associate an asset to a fixture with a device positioned proximate to the fixture, and determine a location of the fixture based on a location of the device. Other embodiments are disclosed and claimed. Non-limiting example applications may include shipping, logistics, warehouse asset tracking, retail, etc.

18 Claims, 10 Drawing Sheets

(56) References Cited

U.S. PATENT DOCUMENTS

| | | | | |
|---|---|---|---|---|
| 2008/0011842 A1* | 1/2008 | Curry | .................. | G06Q 10/087 |
| | | | | 235/385 |
| 2009/0210368 A1* | 8/2009 | Deo | ..................... | G06K 9/6267 |
| | | | | 706/20 |
| 2011/0266338 A1* | 11/2011 | Babcock | ................ | G06Q 10/06 |
| | | | | 235/375 |
| 2014/0306808 A1* | 10/2014 | Jones | ................. | G06K 7/10356 |
| | | | | 340/10.4 |
| 2016/0271800 A1* | 9/2016 | Stubbs | .................. | B25J 9/1666 |
| 2017/0236407 A1* | 8/2017 | Rhoads | ............. | G06F 17/30241 |
| | | | | 455/420 |
| 2018/0005309 A1* | 1/2018 | Croy | ................. | G06Q 30/0603 |
| 2018/0317073 A1* | 11/2018 | Taylor | ................ | G06Q 30/0631 |

OTHER PUBLICATIONS

Intel, "Intel responsive retail platform", retrieved from newsroom.intel.com/newsroom/wp-content/uploads/sites/11/2017/01IntelResponsiveRetailPlatformFactSheet.pdf, 2017, 2 pages.

* cited by examiner

SELF-ADAPTIVE INVENTORY AND FIXTURE TRACKING

TECHNICAL FIELD

Embodiments generally relate to asset tracking. More particularly, embodiments relate to self-adaptive inventory and fixture tracking.

BACKGROUND

Asset tracking may useful for a wide variety of environments and applications. Non-limiting example environments/applications may include shipping, logistics, warehouse asset tracking, retail, etc. Some applications may use handheld scanners or readers to track inventory. In retail applications, articles for sale may include symbols or radio frequency identification (RFID) tags that may be recognized by such handheld scanners/readers.

Internet of things (IoT) devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
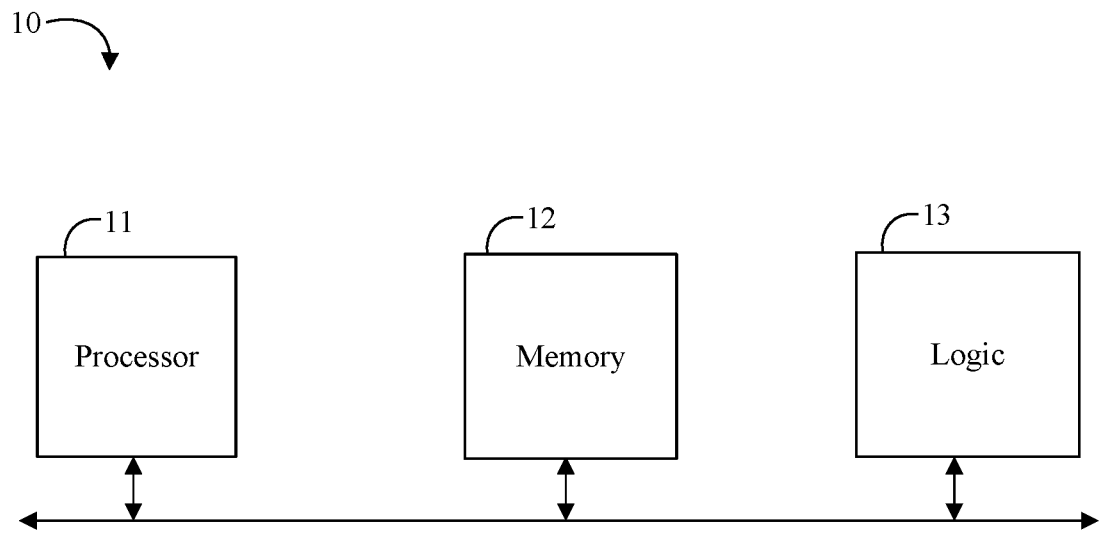
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to associate an asset to a fixture with a device positioned proximate to the fixture, determine a location of the device, and determine a location of the fixture based on the location of the device. In some embodiments of the system 10, the logic 13 may be configured to determine the location of the device based on an indoor position system. For example, the logic 13 may be configured to determine the location of the device based on a radio signal associated with the device. In some embodiments of the system 10, the logic 13 may also be configured to determine if the location of the fixture changed from a prior location of the fixture to a new location. For example, the logic 13 may provide the new location of the fixture to a machine learning application. In some embodiments, the device may include a handheld RFID reader having one or more of a WIFI radio and a BLUETOOTH radio, and the fixture may be configured to display articles for retail sale. Other non-limiting example environments/applications for some embodiments may include shipping, logistics, warehouse asset tracking, etc.

In some embodiments, the system 10 may further include an indoor positioning system (IPS) to determine the location of the device. For example, the IPS may include a geometric arrangement with respect to the location of the fixture. In some embodiments, the IPS may be based on the relative locations of two or more fixtures, enabling the movement of fixtures to update the IPS. In some embodiments, the fixtures may be part of the IPS and the logic 13 may be configured to determine improved or optimal placement of the fixtures for wireless coverage of the system 10 to monitor the movement of the asset(s).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, associating an asset to a fixture with a device positioned proximate to the fixture, determining a location of the device, determining a location of the fixture based on the location of the device, etc.).

Figure 2:
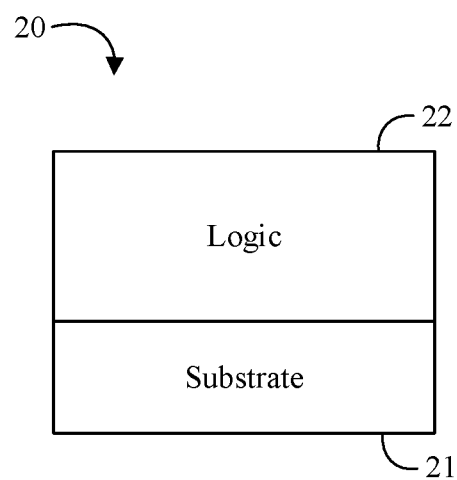
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate, wherein the logic is at least partly implemented in one or more of configurable logic and fixed-functionality hardware logic. The logic 22 coupled to the substrate may be configured to associate an asset to a fixture with a device positioned proximate to the fixture, determine a location of the device, and determine a location of the fixture based on the location of the device. In some embodiments, the logic 22 may be configured to determine the location of the device based on an indoor position system. For example, the logic 22 may be configured to determine the location of the device based on a radio signal associated with the device. In some embodiments, the logic 22 may also be configured to determine if the location of the fixture changed from a prior location of the fixture to a new location. For example, the logic 22 may provide the new location of the fixture to a machine learning application. In some embodiments, the device may include a RFID reader having one or more of a WIFI radio and a BLUETOOTH radio, and the fixture may be configured to display articles for retail sale. Other non-limiting example environments/applications for some embodiments may include shipping, logistics, warehouse asset tracking, etc.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
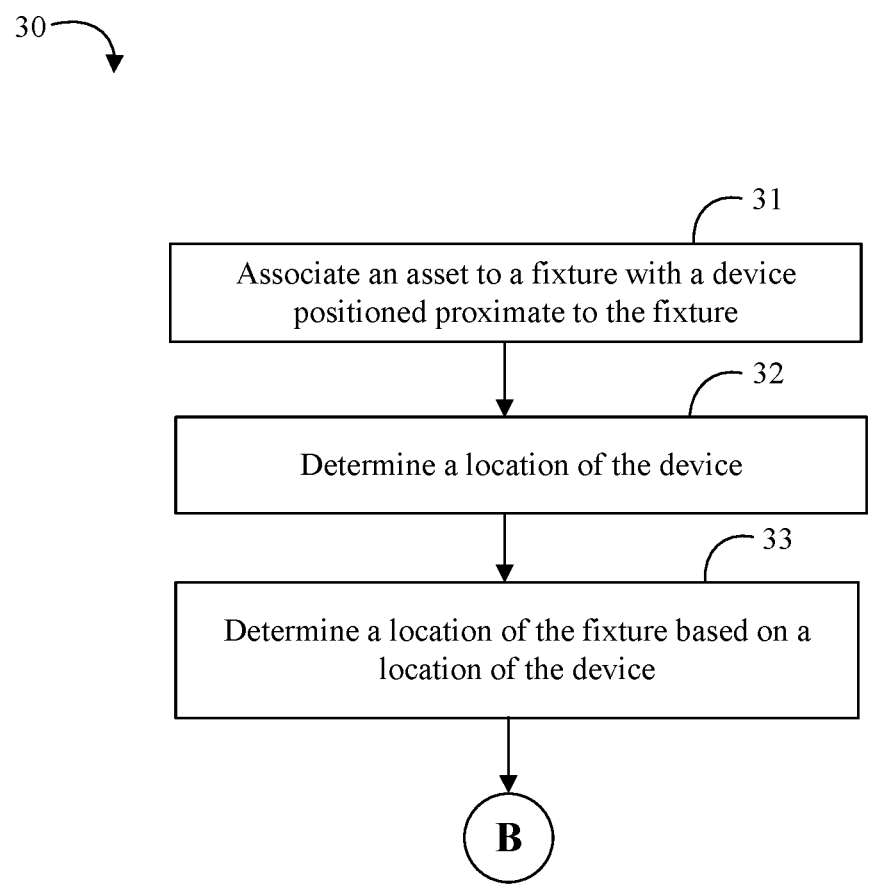
FIGS. 3A to 3B are flowcharts of an example of a method of tracking a fixture according to an embodiment.
Figure 3B:
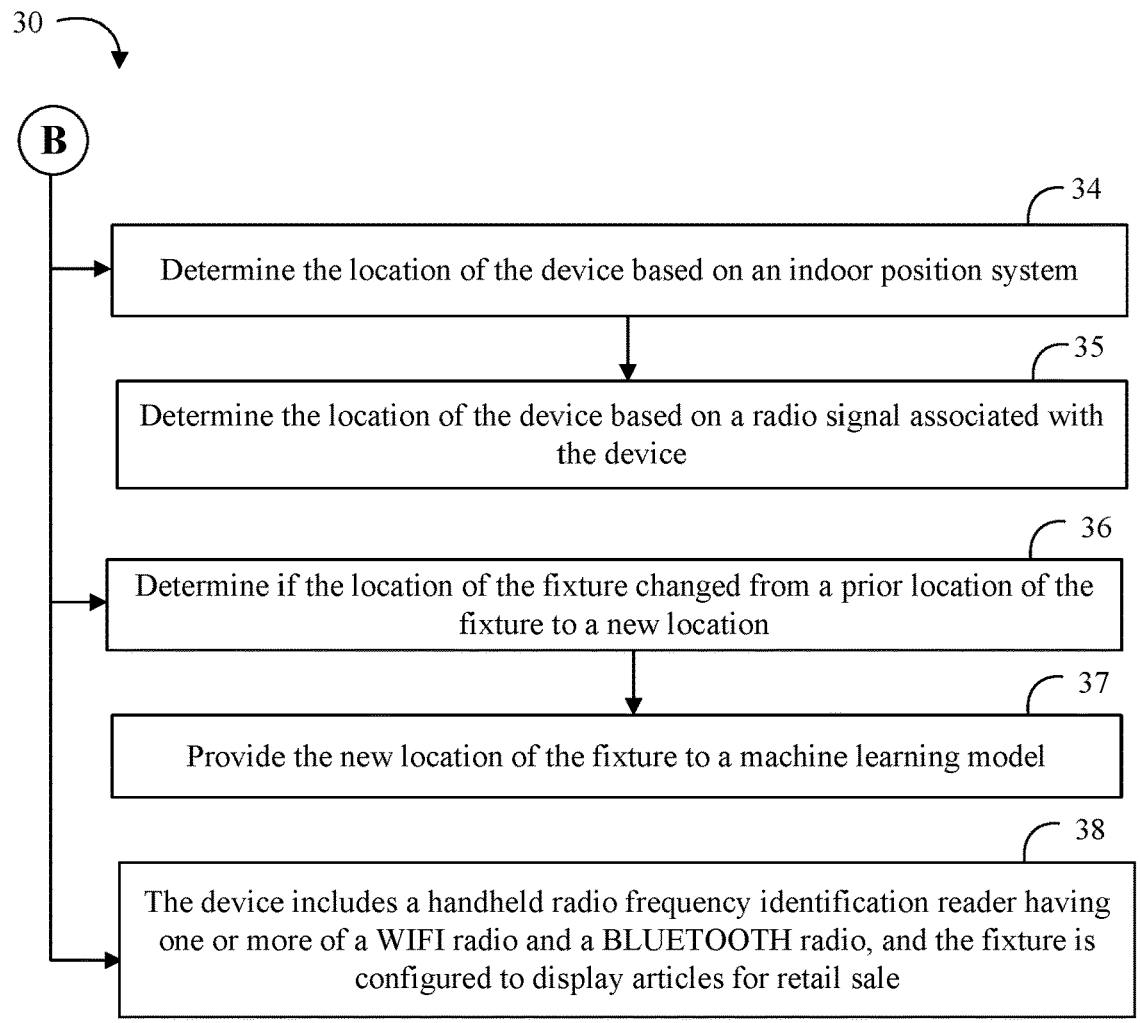

Turning now to FIG. 3, an embodiment of a method 30 of tracking a fixture may include associating an asset to a fixture with a device positioned proximate to the fixture at block 31, determining a location of the device at block 32, and determining a location of the fixture based on a location of the device at block 33. Some embodiments of the method 30 may further include determining the location of the device based on an indoor position system at block 34. For example, the method 30 may include determining the location of the device based on a radio signal associated with the device at block 35. Some embodiments of the method 30 may also include determining if the location of the fixture changed from a prior location of the fixture to a new location at block 36. For example, the method 30 may also include providing the new location of the fixture to a machine learning application at block 37. In some embodiments of the method 30, the device may include a handheld RFID reader having one or more of a WIFI radio and a BLUETOOTH radio, and the fixture may be configured to display articles for retail sale at block 38. Other non-limiting example environments/applications for some embodiments of the method 30 may include shipping, logistics, warehouse asset tracking, etc.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 21 to 26 below. Embodiments or portions of the method 30 may be implemented in applications (e.g., through an application programming interface (API)) or driver software running on an operating system (OS).

Figure 4:
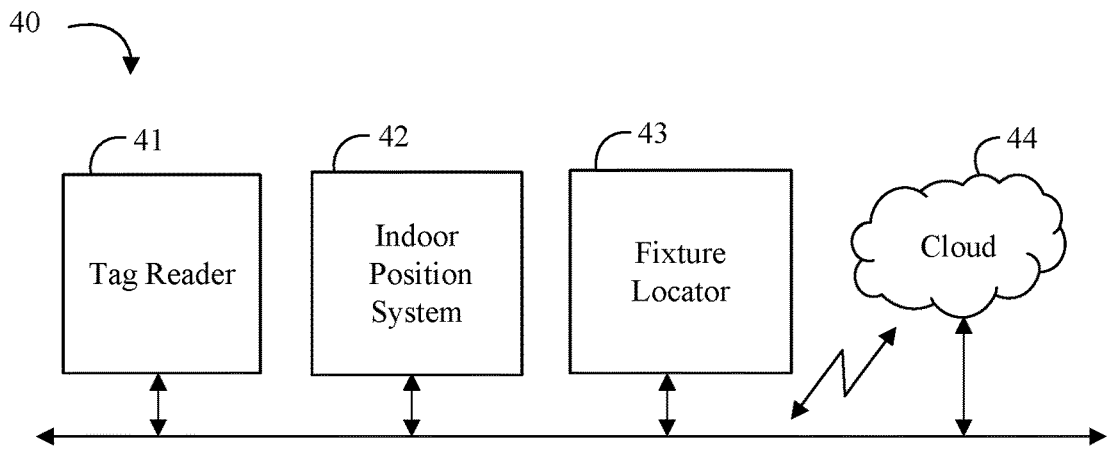
FIG. 4 is a block diagram of an example of a fixture tracker apparatus according to an embodiment.

Turning now to FIG. 4, some embodiments may be logically or physically arranged as one or more modules. For example, an embodiment of a fixture tracker 40 may include a tag reader 41, an indoor position system 42, and a fixture locator 43. For example, the tag reader 41 may associate an asset to a fixture (e.g., where the tag reader 41 is positioned proximate to the fixture). The indoor position system 42 may determine a location of the tag reader 41. The fixture locator 43 may determine a location of the fixture based on the location of the tag reader 41 (e.g., from the indoor position system 42). For example, the indoor position system 42 may be configured to determine the location of the tag reader 41 based on a radio signal associated with the tag reader 41. In some embodiments, the fixture tracker 40 may also be configured to determine if the location of the fixture changed from a prior location of the fixture to a new location. For example, the fixture tracker 40 may provide the new location of the fixture to a machine learning application. In some embodiments, the tag reader 41 may include a RFID reader having one or more of a WIFI radio and a BLUETOOTH radio, and the fixture may be configured to display articles for retail sale. Other non-limiting example environments/applications for some embodiments may include shipping, logistics, warehouse asset tracking, etc.

The fixture tracker 40 may also include a connection to the cloud 44. The cloud connection may be wired, wireless, or a hybrid combination thereof. For example, one or more network nodes may be wired with electrically conducting or optical connections. For example, various databases or information originating from or useful to the tag reader 41, the indoor position system 42, and/or the fixture locator 43 may be located in the cloud 44 or maintained/provided by a cloud service. In some embodiments, the fixture tracker 40 may provide updates to fixture locations to a cloud service which maintains the machine learning application. The cloud service may train/retrain the machine learning model based on information received from the fixture tracker 40 and provide subsequent cloud services to the fixture tracker 40.

Embodiments of the tag reader 41, the indoor position system 42, the fixture locator 43, cloud 44, and other components of the fixture tracker 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide self-adaptive machine-learning based inventory tracking with automated training data collection. Indoor location technology may deliver location-based services. For example, an indoor IPS may locate devices, objects, and/or people inside a building using radio waves, optical signals, machine vision, magnetic fields, acoustic signals, and/or other sensory information. The IPS may include, for example, a grid system or some other geometric arrangement. Machine learning based location tracking may improve the robustness of an IPS against outliers and non-linearity (e.g., utilizing neural networks and/or random forests). A problem for machine learning applications, however, is that the infrastructure may change from time to time. For example, in a brick-and-mortar retailer the display locations may be defined by various furniture locations which may change from time to time (e.g., on a weekly basis or even more frequently in some retail environments). Warehouse infrastructure may also change from time to time. The change in infrastructure may break down an existing machine learning application and require reacquisition of training data (e.g., labeled training data). In other systems, the infrastructure relabeling is supervised (e.g., requiring manual intervention). Advantageously, some embodiments may automate the collection of the training data and automatically update the machine learning application.

Figure 5:
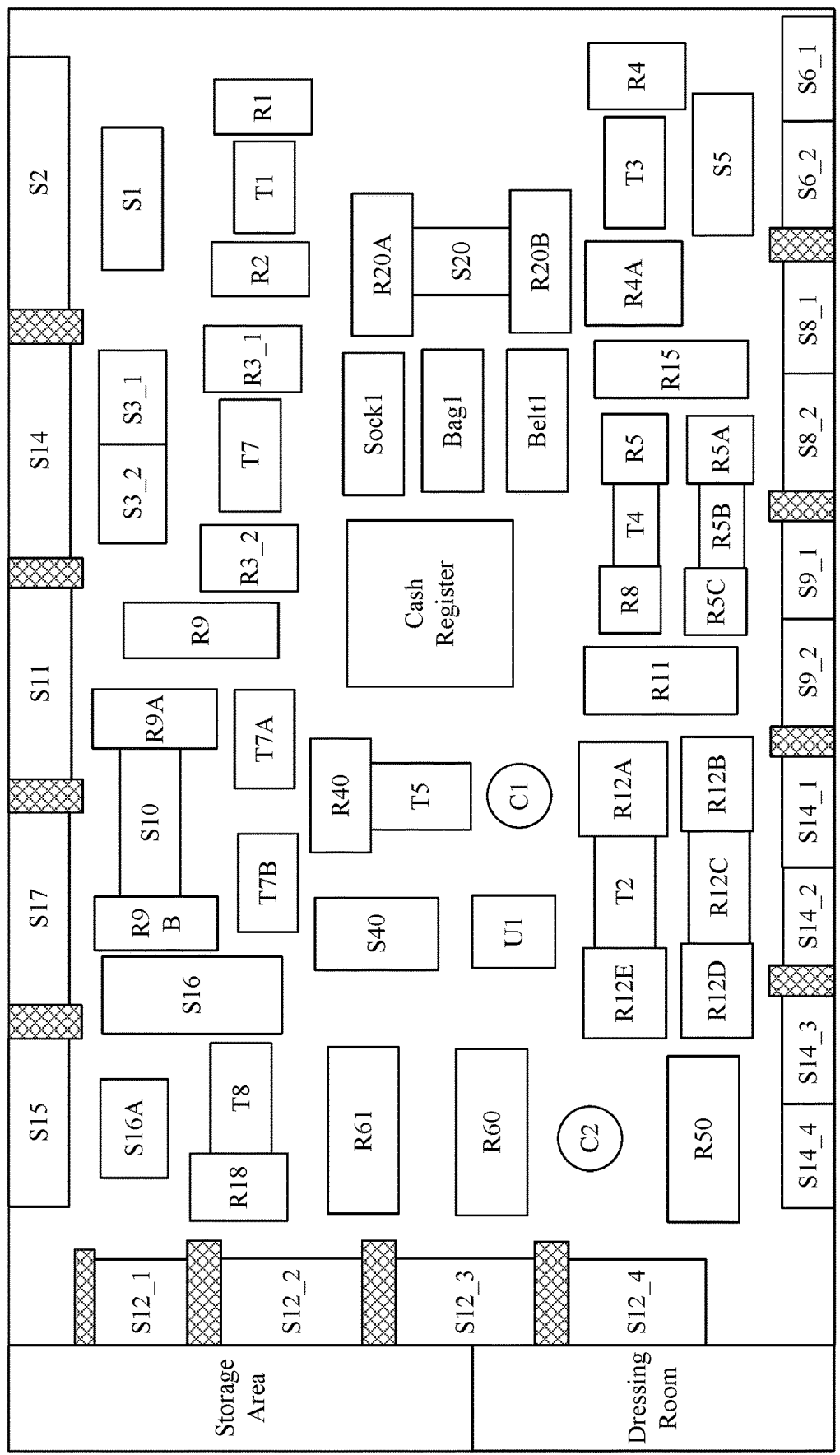
FIG. 5 is an illustrative diagram of an example of a retail environment according to an embodiment.

Turning now to FIG. 5, an example layout of a retail environment may include many shelves (e.g., identified with a leading "S"), tables (e.g., identified with a leading "T"), racks (e.g., identified with a leading "R"), circular racks (e.g., identified with a leading "C"), and other retail display fixtures. The retail environment may also include one or more cash registers (e.g., or other point-of-sale kiosks, dressing rooms, and storage areas). Machine learning based applications may define clothing locations by corresponding locations of furniture holding or displaying the clothes (e.g., shelf, table, rack, etc.). If the location of any furniture changes, the machine learning based location tracking model may need to be retrained. Advantageously, some embodiments may collect the ground truth labeled data in an unsupervised manner (e.g., with little or no additional human efforts). Although described in connection with inventory tracking in a retail environment, some embodiments may be applied to other asset tracking applications including, for example, warehouse logistics, corporate asset tracking, etc.

Figure 6A:
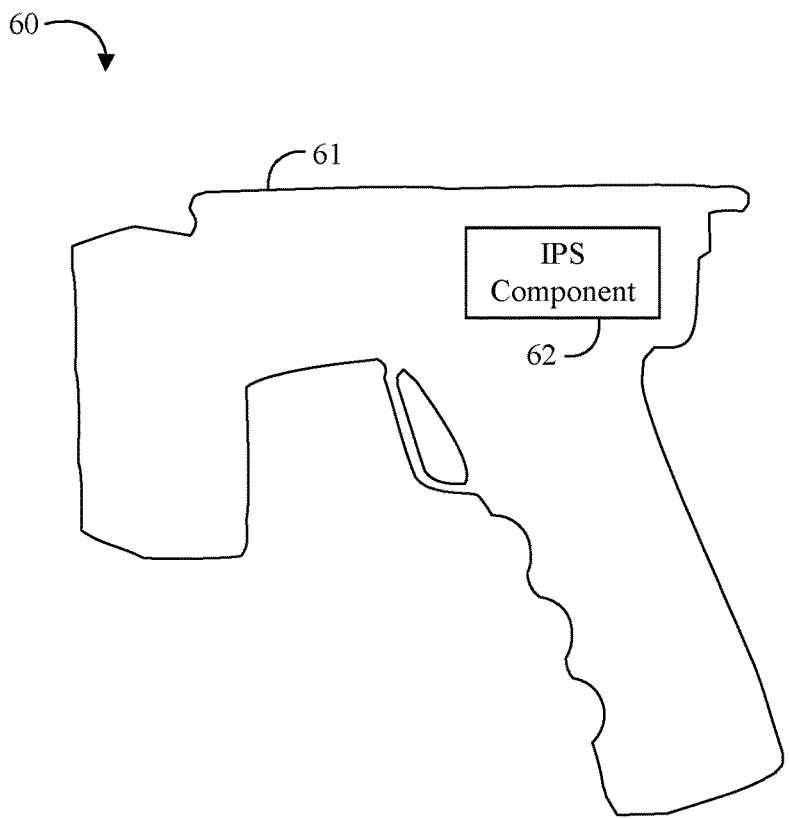
FIG. 6A is an illustrative diagram of an example of a fixture tracking system according to an embodiment.

Turning now to FIG. 6A, an embodiment of a fixture tracking system 60 may include a handheld reader 61 with an integrated IPS component 62. The reader 61 may include any useful asset tracking device such as an optical scanner, an RFID reader, a BLUETOOTH LOW ENERGY (BLE) reader, a NEAR FIELD COMMUNICATION reader (NFC), etc., to read a tag or symbol affixed to or associated with an asset (e.g., an article for sale). The integrated IPS component 62 may include any useful beacon, circuit, device, or component which aids the IPS in locating the position of the IPS component 62 (e.g., and also the location of the handheld reader 61 by its association with the IPS component 62). For example, the IPS component 62 may include a WIFI radio, a BLUETOOTH radio, IBEACON technology, etc. Non-radio technologies including, for example, magnetic positioning technology, inertial positioning technology, visual positioning technology may also be utilized. For magnetic positioning, for example, the IPS component 62 may include an electronic compass component. For inertial positioning, for example, the IPS component 62 may include an inertial measurement unit (IMU). For visual positioning, for example, the IPS component 62 may include a camera to capture images of visual markers. The IPS component 62 may be used by other functions of the handheld reader 61 for other purposes. For example, if the IPS component 62 includes a radio component the radio may be used for communication purposes in addition to positioning purposes.

Figure 6B:
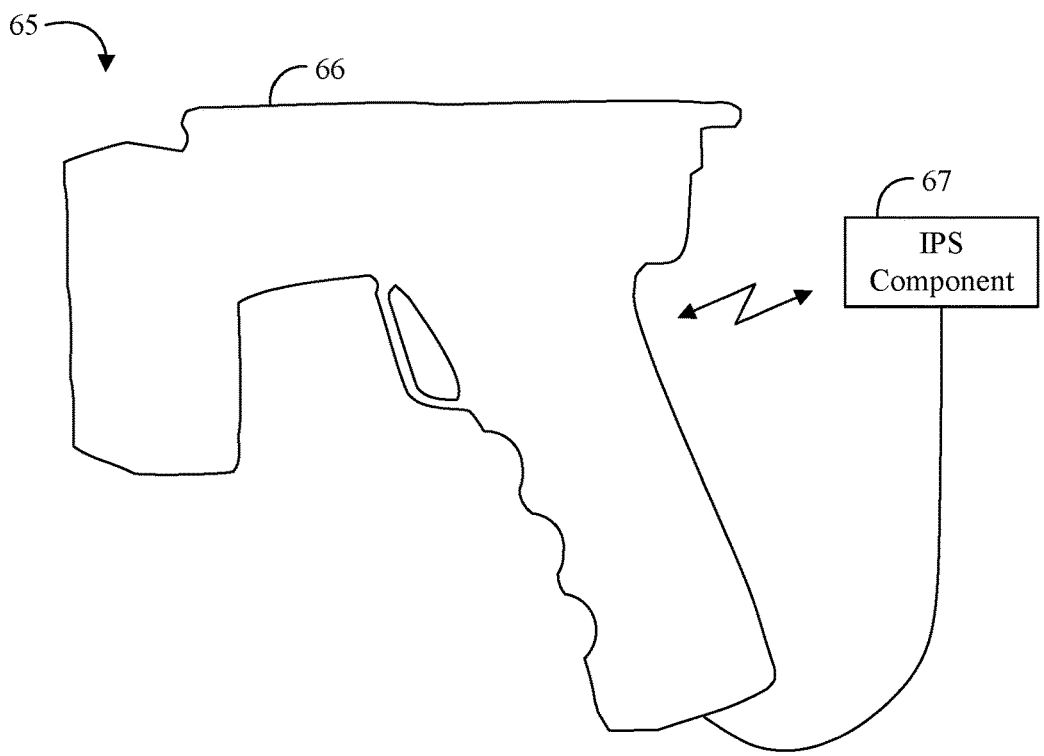
FIG. 6B is an illustrative diagram of another example of a fixture tracking system according to an embodiment.

Turning now to FIG. 6B, an embodiment of a fixture tracking system 65 may include a handheld reader 66 with an external IPS component 67. The reader 66 may include any useful asset tracking device, such as those described elsewhere herein. The integrated IPS component 67 may include any useful beacon, circuit, device, or component which aids the IPS in locating the position of the IPS component 67, such as those described elsewhere herein. When the IPS component is integrated with the reader (e.g., as shown in FIG. 6A), the location of the IPS component may be considered as a direct proxy for the location of the reader. For the fixture tracking system 65, however, the IPS component 67 may be external to the reader 66. For example, the IPS component 67 may be included in a laptop, a tablet device, a smartphone, or some other electronic device (e.g., a device carried by the user of the reader 66) that is paired with or otherwise associated with the reader 66 (e.g., either wired, wirelessly, or a combination thereof). Additionally, or alternatively, the user of the handheld reader 66 may wear a headset (e.g., a BLUETOOTH headset) or other wearable device that is paired or otherwise associated with the reader 66. In this manner, some embodiments may use the location of the external IPS component 67 as an indirect proxy for the location of the reader 66. Such pairings or associations may be configurable and/or may change from time to time.

Some embodiments may advantageously utilize an out-of-band signal for indoor positioning such as, for example, WIFI fingerprinting (e.g., with a 1-2 meter accuracy) and/or ultra wideband (UWB) trilateration (e.g., with a 20 centimeter accuracy). For example, a handheld RFID reader may include a BLUETOOTH subsystem (e.g., and/or a WIFI subsystem) which may be readily paired with other handheld or wearable devices (e.g., a tablet and/or a headset) which may also include other radio technologies which may be useful for WIFI fingerprinting, UWB trilateration, triangulation, triangulateration, etc. In accordance with some embodiments, such radio technology may be utilized to determine the location of a handheld RFID reader.

During inventory tracking, the store staff may use a handheld reader (e.g., as described in connection with FIGS. 6A to 6B), to scan each article upon moving it over from one place to another. For example, when a pair of jeans with apparel ID of Jeans-1 is placed on Rack-1, the store staff will scan the jeans and enter the furniture identification of Rack-1 to create a tuple of [Jeans-1, Rack-1]. The store staff may manually enter the furniture identification, or the furniture itself may include a symbol or tag that provides the appropriate identification. For example, the user may first scan the jeans and then the rack to create the tuple of [Jeans-1, Rack-1]. Alternatively, when multiple articles are being relocated, the user may first scan the rack and then each article that is being placed on the rack to efficiently create multiple tuples ([Jeans-1, Rack-1], [Jeans-2, Rack-1], [Jeans-N, Rack-1]). In any event, a typical inventory tracking process may allow the store staff to be able to collect an ordered set of values (e.g., tuples) of [Apparel-ID, Furniture-ID]. Advantageously, with little or no additional manual effort, some embodiments may determine the location of the fixtures based on the locations of the readers during the inventory process.

As noted previously, some embodiments may provide automated collection of labeled training data for asset tracking. For example, upon any collection by the store staff of a tuple [Apparel-ID, F=Furniture-ID], the location of the furniture may be determined based on a measurement R of the location of the RFID reader. The location of the RFID may be considered a reasonable approximation for the location of the furniture because it may be reasonable to assume that the user is near or proximate to the furniture when they scan the RFID tag (e.g., or the user's may be trained to always be near the furniture holding the articles when they perform asset inventory). Likewise, if the IPS component is not integrated with the RFID reader, the location of the IPS component may be considered as a reasonable approximation for the location of the reader, user, and/or furniture. In some embodiments, multiple RFID location measurements may be aggregated to determine the location of the furniture. For example, as the user moves along a wide shelf the IPS component location may vary even though the Furniture-ID does not. Similarly, as the user moves around a circular rack the multiple location measurements may help indicate the center of the circular rack location and the size of the circular rack. In some embodiments, RFID reader/IPS component locations from multiple users may be aggregated as well (e.g., a first user scans an RFID tag near one end of shelf, a second user scans an RFID tag near another end or the middle of the shelf, etc.).

If the furniture location is determined to have changed, the tuples along with the corresponding measurements R from the RFID readers may later be used for retraining a new machine learning application. Advantageously, the tuples of [Apparel-ID, F=Furniture-ID] may be collected automatically in the retail inventory tracking process, and the location change may be detected automatically using an out-of-band indoor positioning technology. Accordingly, some embodiments may provide online adaptiveness and/or reduced or minimized additional human efforts.

Some embodiments may utilize machine learning for asset tracking. For example, the collection of tuples of [Apparel-ID, F=Furniture-ID], along with the corresponding measurements R from a collection of RFID readers, may serve as the input to a supervised machine learning method for asset tracking. Some machine learning applications may learn the relationship between R and F and may predict F given R. For example, the furniture location may define the measurements R of apparel when the apparel sits on the furniture, based on the tuple [Apparel-ID, Furniture-ID]. Upon location changes of any furniture, the machine learning application may be retrained with a newly collected dataset in the new furniture setting. Some embodiments may immediately initiate such retraining upon any detected furniture location change, while some embodiments may initiate such retraining periodically, on a schedule, or based on other criteria (e.g., after N changes in location).

Figure 7:
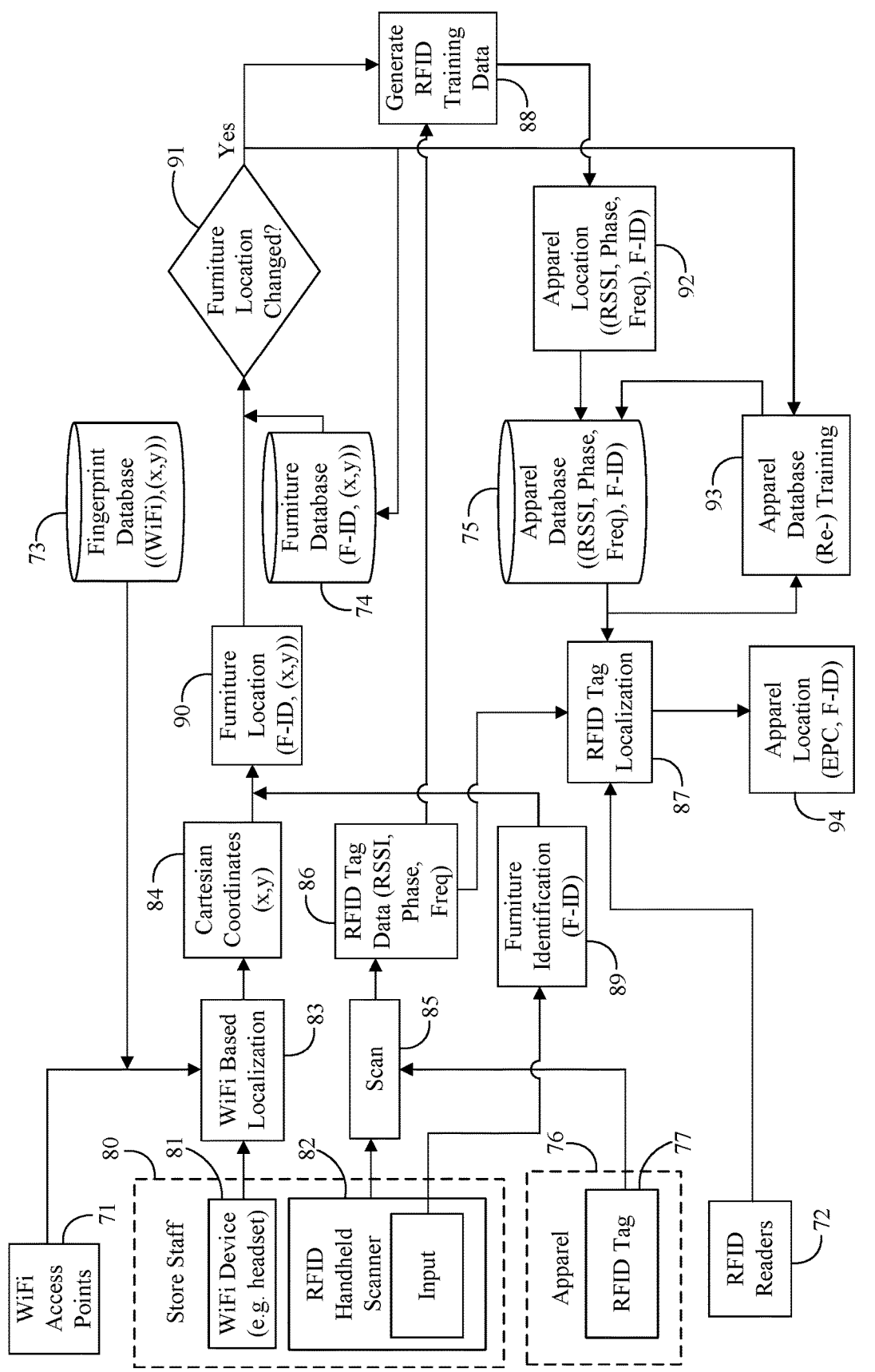
FIG. 7 is a block diagram of an example of another electronic processing according to an embodiment.

Turning now to FIG. 7, an electronic processing system 70 may include one or more WIFI access points 71 and one or more RFID readers 72. The system 70 may include multiple databases including a fingerprint database 73, a furniture database 74, and an apparel database 75. Apparel 76 may be associated with or have RFID tags 77 affixed on the apparel 76. The store staff 80 may wear or carry a WIFI device 81 and may also carry a handheld RFID reader 82. An IPS may include WIFI based localization 83 to provide a set of Cartesian coordinates (x, y) 84 for the WIFI device 81 (e.g., using the fingerprint database 73). When the store staff 80 performs a scan 85 of an RFID tag 77, RFID tag data 86 (e.g., received signal strength indication (RSSI), phase, frequency, etc.) may be used for RFID tag localization 87 and to generate RFID training data 88.

The store staff may also scan or otherwise input the furniture identification (F-ID) 89 and the Cartesian coordinates (x, y) 84 of the WIFI device 81 may be used as a proxy for the furniture location 90 (e.g., creating a tuple of [F-ID, (x, y)]). The furniture location 90 may be compared with the furniture database 74 to determine if the furniture location changed at 91. For example, the furniture database 74 may initially include null data for the furniture location for each F-ID such that the determination at 91 may trigger the initial generation of RFID training data 88. Subsequently, changes in the furniture location 90 may trigger retraining. The RFID training data 88 may be used to determine the apparel location 92 (e.g., [RFID data, F-ID]), while changes in the furniture location at 91 may trigger an apparel database retraining 93. The RFID tag localization 87 may pull information from the apparel database 75 to determine the apparel location 94 (e.g., creating a tuple of [electronic product code (EPC), F-ID]).

In the system 70, RFID technology may be a non-limiting example for machine learning based asset tracking and WIFI technology may be a non-limiting example of a beacon for continuous indoor positioning. Other tracking and/or radio/IPS technologies may be used in other embodiments. The apparel database (re-)training 93 may be performed immediately anytime when furniture location changed or scheduled on a regular basis, depending on whichever makes more sense in a given use case. Some embodiments may advantageously utilize an out-of-band localization technology to reinforce machine learning based applications for precision asset tracking by automating collection of labeled training data. Some embodiments may be seamlessly integrated into inventory tracking of any brick-and-mortar retailers with little or no additional human efforts. In a retail environment where users scan each article upon moving the article, for example, some embodiments may provide self-adapting model reinforcement. For example, the process to collect ground truth labeled data may not require any additional supervision in addition to a typical retail inventory tracking process.

Additionally, or alternatively, some embodiments may advantageously provide online adaptiveness because the machine learning based application for precision asset tracking may be relatively more unsupervised because an infrastructure change may automatically trigger recollection of training datasets in order to retrain the machine learning application. Some embodiments may enable robust, precision location sensing, and sustainable location-based services with reduced deployment cost/efforts. Various embodiments may be implemented with any suitable electronics/computer technology including, for example, laptops, tablets, smartphones, handheld devices, and wearable devices. Many of the embodiments described herein include wireless components. In some embodiments, however, one or more such components may alternatively, or additionally, include wired connections such as electrically conducting wires or optical connections.

Figure 8:
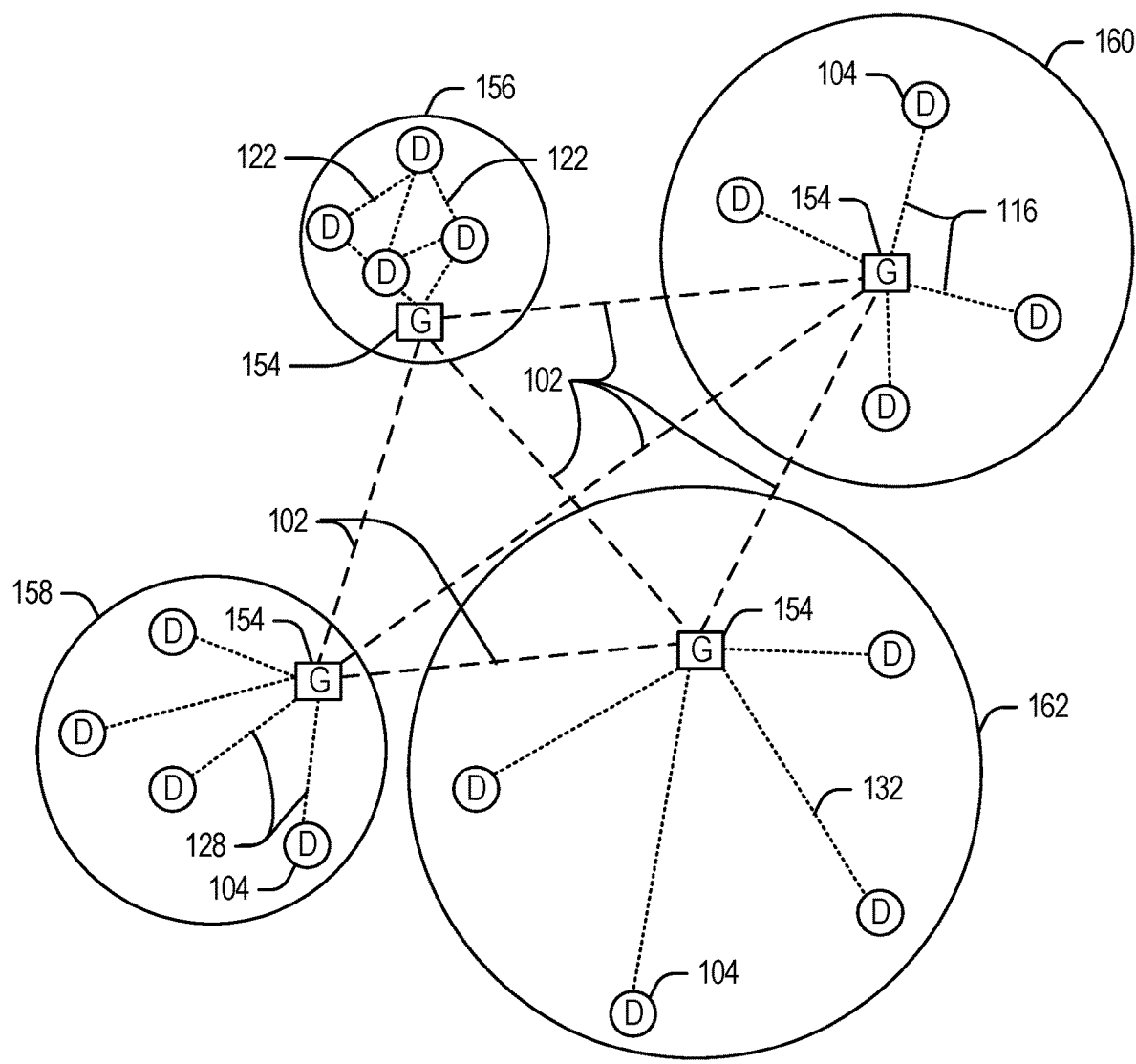
FIG. 8 illustrates a domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
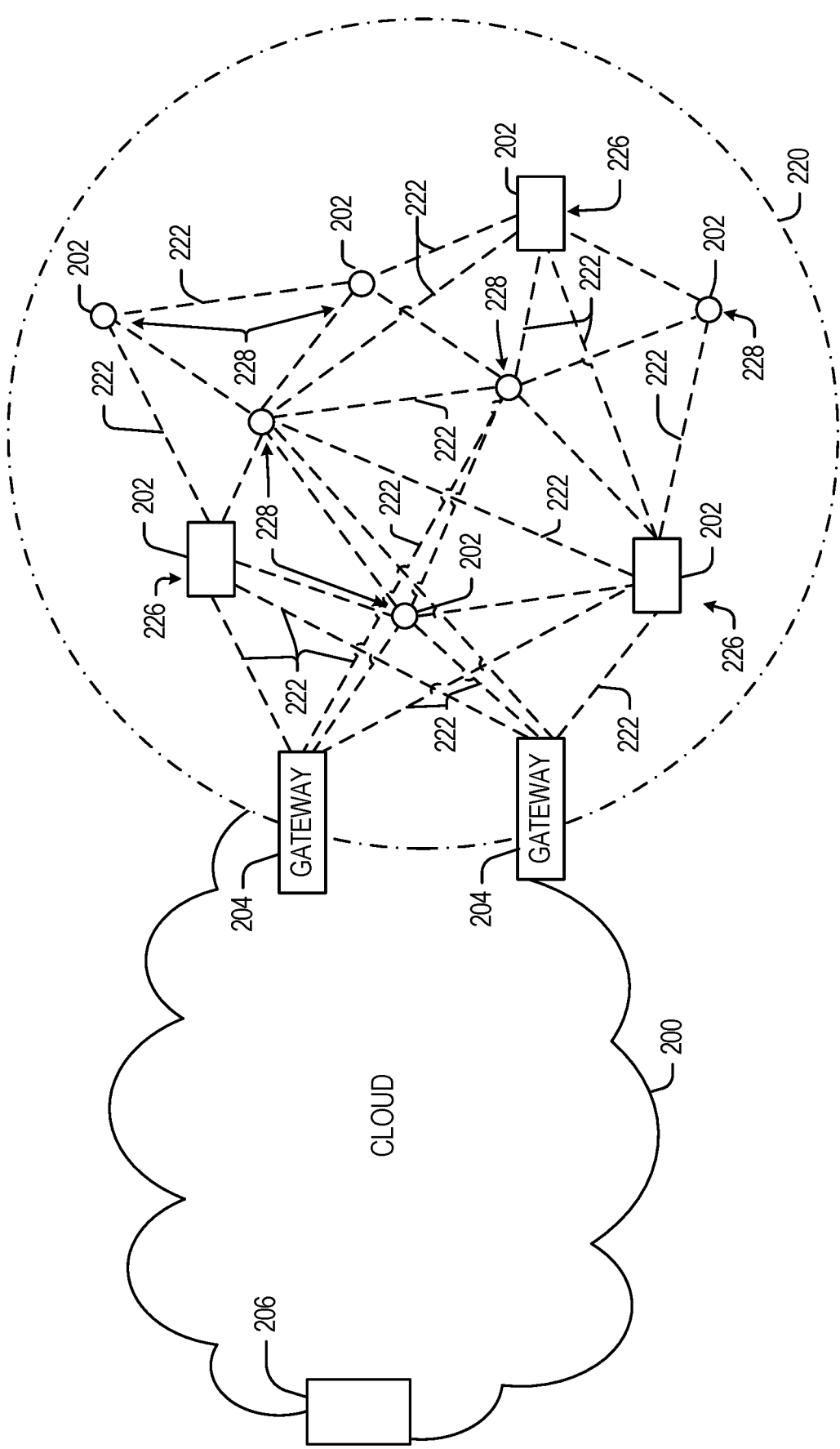
FIG. 9 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

FIG. 9 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 1 to 7 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
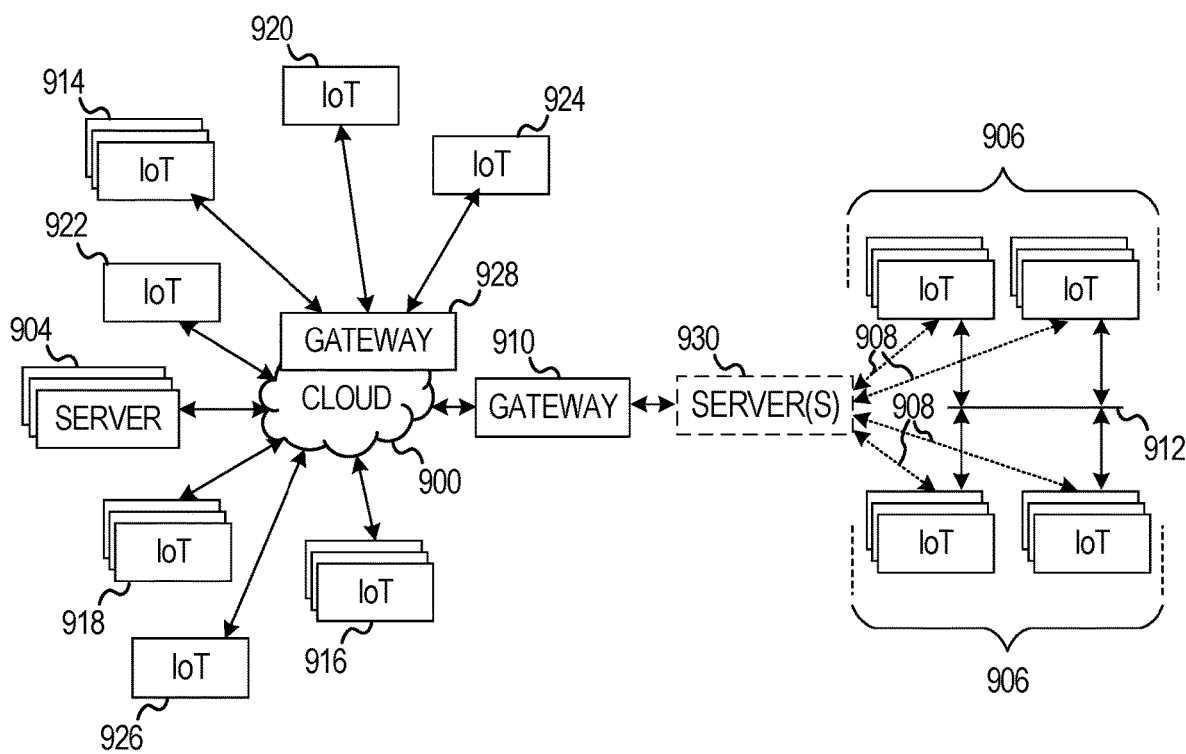
FIG. 10 illustrates a block diagram of a network illustrating communications among a number of IoT devices, according to an example.

FIG. 10 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 10, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 11:
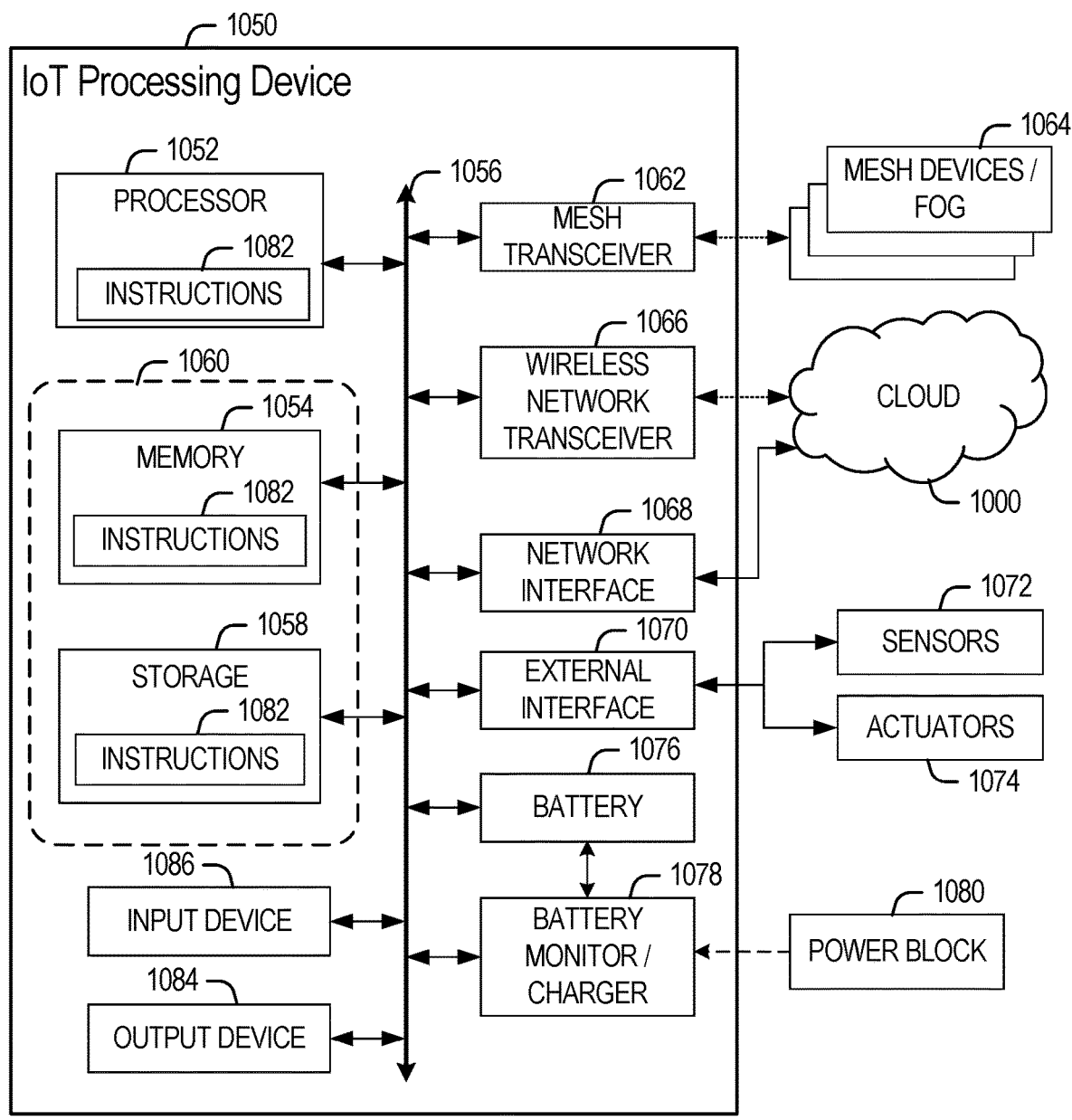
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 11 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™ an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 11 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

ADDITIONAL NOTES AND EXAMPLES

Example 1 may include an electronic processing system, comprising a processor, memory communicatively coupled to the processor, and logic communicatively coupled to the processor to associate an asset to a fixture with a device positioned proximate to the fixture, determine a location of the device, and determine a location of the fixture based on the location of the device.

Example 2 may include the system of Example 1, wherein the logic is further to determine the location of the device based on an indoor position system.

Example 3 may include the system of Example 3, wherein the logic is further to determine the location of the device based on a radio signal associated with the device.

Example 4 may include the system of Example 1, wherein the logic is further to determine if the location of the fixture changed from a prior location of the fixture to a new location.

Example 5 may include the system of Example 4, wherein the logic is further to provide the new location of the fixture to a machine learning application.

Example 6 may include the system of any of Examples 1 to 5, wherein the device includes a handheld radio frequency identification reader having one or more of a WIFI radio and a BLUETOOTH radio, and wherein the fixture is configured to display articles for retail sale.

Example 7 may include the system of Example 1, further comprising an indoor position system to determine the location of the device, the indoor position system including a geometric arrangement with respect to the location of the fixture.

Example 8 may include the system of Example 7, wherein the indoor position system is based on the relative locations of two or more fixtures.

Example 9 may include a semiconductor package apparatus, comprising a substrate, and logic coupled to the substrate, wherein the logic is at least partly implemented in one or more of configurable logic and fixed-functionality hardware logic, the logic coupled to the substrate to associate an asset to a fixture with a device positioned proximate to the fixture, determine a location of the device, and determine a location of the fixture based on the location of the device.

Example 10 may include the apparatus of Example 9, wherein the logic is further to determine the location of the device based on an indoor position system.

Example 11 may include the apparatus of Example 10, wherein the logic is further to determine the location of the device based on a radio signal associated with the device.

Example 12 may include the apparatus of Example 9, wherein the logic is further to determine if the location of the fixture changed from a prior location of the fixture to a new location.

Example 13 may include the apparatus of Example 12, wherein the logic is further to provide the new location of the fixture to a machine learning application.

Example 14 may include the apparatus of any of Examples 9 to 13, wherein the device includes a handheld radio frequency identification reader having one or more of a WIFI radio and a BLUETOOTH radio, and wherein the fixture is configured to display articles for retail sale.

Example 15 may include a method of tracking a fixture, comprising associating an asset to a fixture with a device positioned proximate to the fixture, determining a location of the device, and determining a location of the fixture based on the location of the device.

Example 16 may include the method of Example 15, wherein the logic is further to determining the location of the device based on an indoor position system.

Example 17 may include the method of Example 16, wherein the logic is further to determining the location of the device based on a radio signal associated with the device.

Example 18 may include the method of Example 15, wherein the logic is further to determining if the location of the fixture changed from a prior location of the fixture to a new location.

Example 19 may include the method of Example 18, wherein the logic is further to providing the new location of the fixture to a machine learning application.

Example 20 may include the method of any of Examples 15 to 19, wherein the device includes a handheld radio frequency identification reader having one or more of a WIFI radio and a BLUETOOTH radio, and wherein the fixture is configured to display articles for retail sale.

Example 21 may include at least one computer readable medium, comprising a set of instructions, which when executed by a computing device, cause the computing device to associate an asset to a fixture with a device positioned proximate to the fixture, determine a location of the device, and determine a location of the fixture based on a location of the device.

Example 22 may include the at least one computer readable medium of Example 21, comprising a further set of instructions, which when executed by the computing device, cause the computing device to determine the location of the device based on an indoor position system.

Example 23 may include the at least one computer readable medium of Example 22, comprising a further set of instructions, which when executed by the computing device, cause the computing device to determine the location of the device based on a radio signal associated with the device.

Example 24 may include the at least one computer readable medium of Example 21, comprising a further set of instructions, which when executed by the computing device, cause the computing device to determine if the location of the fixture changed from a prior location of the fixture to a new location.

Example 25 may include the at least one computer readable medium of Example 24, comprising a further set of instructions, which when executed by the computing device, cause the computing device to provide the new location of the fixture to a machine learning application.

Example 26 may include the at least one computer readable medium of any of Examples 21 to 25, wherein the device includes a handheld radio frequency identification reader having one or more of a WIFI radio and a BLUETOOTH radio, and wherein the fixture is configured to display articles for retail sale.

Example 27 may include a fixture tracker apparatus, comprising means for associating an asset to a fixture with a device positioned proximate to the fixture, means for determining a location of the device, and means for determining a location of the fixture based on the location of the device.

Example 28 may include the apparatus of Example 27, wherein the logic is further to means for determining the location of the device based on an indoor position system.

Example 29 may include the apparatus of Example 28, wherein the logic is further to means for determining the location of the device based on a radio signal associated with the device.

Example 30 may include the apparatus of Example 27, wherein the logic is further to means for determining if the location of the fixture changed from a prior location of the fixture to a new location.

Example 31 may include the apparatus of Example 30, wherein the logic is further to means for providing the new location of the fixture to a machine learning application.

Example 32 may include the apparatus of any of Examples 27 to 31, wherein the device includes a handheld radio frequency identification reader having one or more of a WIFI radio and a BLUETOOTH radio, and wherein the fixture is configured to display articles for retail sale.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
associate an asset to a fixture with a mobile device positioned proximate to the fixture, wherein the mobile device is to include one or more of a wearable mobile device or a handheld mobile device, and the asset is an article for sale,
determine a location coordinate for the mobile device,
determine a location of the fixture based on a use of the location coordinate for the mobile device as an approximation for the location of the fixture,
determine if the location of the fixture changed from a prior location of the fixture to a new location of the fixture, and
provide the new location of the fixture to a machine learning application.

2. The system of claim 1, wherein the logic is further to:
determine the location coordinate for the mobile device based on an indoor position system.

3. The system of claim 2, wherein the logic is further to:
determine the location coordinate for the mobile device based on a radio signal associated with the mobile device.

4. The system of claim 1, wherein the mobile device includes a handheld radio frequency identification reader having wireless technology, and wherein the fixture is configured to support and display articles in a retail environment.

5. The system of claim 1, further comprising:
an indoor position system to determine the location coordinate for the mobile device, the indoor position system including a geometric arrangement with respect to the location of the fixture.

6. The system of claim 5, wherein the indoor position system is based on the relative locations of two or more fixtures.

7. A semiconductor package apparatus, comprising:
a substrate; and
logic coupled to the substrate, wherein the logic is at least partly implemented in one or more of configurable logic and fixed-functionality hardware logic, the logic coupled to the substrate to:
associate an asset to a fixture with a mobile device positioned proximate to the fixture, wherein the mobile device is to include one or more of a wearable mobile device or a handheld mobile device, and the asset is an article for sale,
determine a location coordinate for the mobile device,
determine a location of the fixture based on a use of the location coordinate for the mobile device as an approximation for the location of the fixture,
determine if the location of the fixture changed from a prior location of the fixture to a new location of the fixture, and
provide the new location of the fixture to a machine learning application.

8. The apparatus of claim 7, wherein the logic is further to:
determine the location coordinate for the mobile device based on an indoor position system.

9. The apparatus of claim 8, wherein the logic is further to:
determine the location coordinate for the mobile device based on a radio signal associated with the mobile device.

10. The apparatus of claim 7, wherein the mobile device includes a handheld radio frequency identification reader having wireless technology, and wherein the fixture is configured to support and display articles in a retail environment.

11. A method of tracking a fixture, comprising:
associating an asset to a fixture with a mobile device positioned proximate to the fixture, wherein the mobile device includes one or more of a wearable mobile device or a handheld mobile device, and the asset is an article for sale;
determining a location coordinate for the mobile device;
determining a location of the fixture based on a use of the location coordinate for the mobile device as an approximation for the location of the fixture;
determine if the location of the fixture changed from a prior location of the fixture to a new location of the fixture; and
provide the new location of the fixture to a machine learning application.

12. The method of claim 11, further comprising:
determining the location coordinate for the mobile device based on an indoor position system.

13. The method of claim 12, further comprising:
determining the location coordinate for the mobile device based on a radio signal associated with the mobile device.

14. The method of claim 11, wherein the mobile device includes a handheld radio frequency identification reader having technology, and wherein the fixture is configured to support and display articles in a retail environment.

15. At least one computer readable medium, comprising a set of instructions, which when executed by a computing device, cause the computing device to:
associate an asset to a fixture with a mobile device positioned proximate to the fixture,
wherein the mobile device is to include one or more of a wearable mobile device or a handheld mobile device, and the asset is an article for sale;
determine a location coordinate for the mobile device;
determine a location of the fixture based on a use of the location coordinate for the mobile device as an approximation for the location of the fixture;
determine if the location of the fixture changed from a prior location of the fixture to a new location of the fixture; and
provide the new location of the fixture to a machine learning application.

16. The at least one computer readable medium of claim 15, comprising a further set of instructions, which when executed by the computing device, cause the computing device to:
determine the location coordinate for the mobile device based on an indoor position system.

17. The at least one computer readable medium of claim 16, comprising a further set of instructions, which when executed by the computing device, cause the computing device to:
determine the location coordinate for the mobile device based on a radio signal associated with the mobile device.

18. The at least one computer readable medium of claim 15, wherein the device includes a handheld radio frequency identification reader having wireless technology, and wherein the fixture is configured to support and display articles in a retail environment.

\* \* \* \* \*